United States Patent
Koo et al.

(10) Patent No.: US 7,174,039 B2
(45) Date of Patent: Feb. 6, 2007

(54) SYSTEM AND METHOD FOR EMBODYING VIRTUAL REALITY

(75) Inventors: Bon-Ki Koo, Daejeon (KR); Sung-Ye Kim, Daejeon (KR); Hae-Dong Kim, Daejeon (KR); Jae-Chul Kim, Daejeon (KR); Byoung-Tae Choi, Daejeon (KR)

(73) Assignee: Electronics and Telecommunications Research Institute (KR)

( * ) Notice: Subject to any disclaimer, the term of this patent is extended or adjusted under 35 U.S.C. 154(b) by 709 days.

(21) Appl. No.: 10/404,025

(22) Filed: Apr. 1, 2003

(65) Prior Publication Data
US 2004/0095385 A1 May 20, 2004

(30) Foreign Application Priority Data
Nov. 18, 2002 (KR) .................. 10-2002-0071499

(51) Int. Cl.
G06K 9/00 (2006.01)
G06K 9/68 (2006.01)
G06T 15/00 (2006.01)

(52) U.S. Cl. .................. 382/154; 382/218; 345/419

(58) Field of Classification Search ............ 382/103, 382/108, 154, 218, 276; 345/419–420
See application file for complete search history.

(56) References Cited

U.S. PATENT DOCUMENTS 6,278,460 B1    8/2001  Myers et al.
6,628,298 B1 *  9/2003  Debevec ............ 345/632
6,888,552 B2 *  5/2005  Debevec et al. ...... 345/589
6,903,738 B2 *  6/2005  Pfister et al. ....... 345/420
6,993,200 B2 *  1/2006  Tastl et al. ........ 382/240

OTHER PUBLICATIONS

Larson "A visibility Matching Tone Reproduction Operator for High Dynamic Range Scenes", university of Cliforina, 19997, pp. 1-35.*
Cohen, et al. (Real-Time High Dynamic Range Texture Mapping, University of Southern California, 2001, pp. 1-10.*
1999 IEEE; "Flexible Camera Calibration By Viewing a Plane From Unknown Orientations", Z. Zhang, 8 pages.
SIGGRAPH 98, "Rendering Synthetic Objects into Real Scenes: Bridging Traditional and Image-based Graphics with Global . . . ", P. Debevec, 10 pages.

* cited by examiner

Primary Examiner—Daniel Mariam
(74) Attorney, Agent, or Firm—Blakely Sokoloff Taylor & Zafman

(57) ABSTRACT

A virtual reality embodying system uses 2D images and HDRI data taken of a target object through a camera to embody virtual reality. A modeling unit compares the 2D image's coordinate with a real coordinate to calculate a transform matrix, calculates a vanishing point of a reference vector, uses the vanishing point to calculate a camera matrix, uses the camera matrix and the transform matrix to calculate a rotation matrix and a translation matrix, and uses the rotation matrix and the translation matrix to model the 2D image into a virtual model. A rendering unit uses the HDRI data as texture to render the virtual model, and embodies the HDRI into an extended VRML node to apply the virtual model to the VRML environment.

21 Claims, 3 Drawing Sheets

SYSTEM AND METHOD FOR EMBODYING VIRTUAL REALITY

CROSS REFERENCE TO RELATED APPLICATION

This application is based on Korea Patent Application No. 2002-71499 filed on Nov. 18, 2002 in the Korean Intellectual Property Office, the content of which is incorporated herein by reference.

BACKGROUND OF THE INVENTION (a) Field of the Invention

The present invention relates to a system and method for embodying virtual reality.

(b) Description of the Related Art

Recently, various methods for embodying objects and environments which look identical to the real world into virtual space have been attempted in research fields of modeling and rendering of objects. Since conventional modeling methods use expensive devices to model virtual reality, it is very expensive, and there are many difficulties to overcome in implementing the same.

Therefore, requirements for minimum pieces of the devices and easy access methods tend to increase, and accordingly, methods for embodying 3-dimensional (3D) virtual models using a plurality of 2-dimensional (2D) images captured through a camera have been developed. Together with these developments, research for applying HDRIs (high dynamic range images) to the rendering process of virtual objects has also actively progressed. Using HDRIs allows more realistic results compared to conventional image-based techniques such as general images (including JPEGs, BMPs, and TGAs). However, no current techniques have succeeded in applying the HDRI-using rendering techniques to the VRML (virtual reality modeling language) field, and no clients for supporting them have been developed.

SUMMARY OF THE INVENTION

It is an object of the present invention to provide a virtual reality embodying system for easily embodying virtual reality from 2D images.

It is another object of the present invention to apply a rendering technique using HDRIs to a VRML environment to embody virtual reality.

In one aspect of the present invention, a virtual reality embodying system for using a 2-dimensional (2D) image captured from a target object through a camera and HDRI (high dynamic range image) data to form a virtual space, comprises: an image-based modeling unit for comparing a coordinate of the 2D image with a real coordinate to calculate a transform matrix, calculating a vanishing point of a reference vector from the transform matrix, using the vanishing point to calculate a camera matrix, and using the camera matrix and the transform matrix to model the 2D image into a virtual model; and an image-based rendering unit for using the HDRI data as a texture to render the virtual model.

The image-based modeling unit comprises: a camera calibrator including a transform matrix calculator for calculating the transform matrix, a vanishing point calculator for transforming the reference vector into the transform matrix to calculate the vanishing point, a camera matrix calculator for using the vanishing point to determine a principal point of the camera and using the principal point to determine the camera matrix, and a rotation and translation calculator for calculating a camera rotation matrix and a camera translation vector through the camera matrix and the transform matrix; and a modeling unit for matching the 2D image with the virtual model and combining the virtual model with the texture by using the camera matrix and the translation vector.

The vanishing point calculator uses two sides which are orthogonal on a predetermined plane to calculate the vanishing point using the reference vector. The 2D image is photographed when the target object is put on a calibration board on which squares of at least two colors are alternately and continuously arranged.

The modeling unit comprises: a primitive database for storing data of basic 3D models in coordinate formats; a triangulation unit for producing corresponding points of the 2D image obtained from the target object, using the camera rotation matrix and the camera translation matrix to back-project the corresponding points into a 3D space, and finding intersection points of lines back projected to the 3D space; and a texture mapper for extracting color information from the 2D image to map the same to the virtual model.

The image-based rendering unit comprises: an HDRI analyzer for analyzing the HDRI data, extracting 3D illumination data from the HDRI data to store them, and performing tone mapping for displaying the HDRI data; and a rendering unit for using the data generated by the HDRI analyzer to perform texture mapping for rendering the virtual model.

The HDRI analyzer comprises: an HDRI element separator for diffusing the HDRI data and separating them for each specular element to store them as new HDRI data; a 3D illumination information extractor for extracting 3D location information and color information on the illumination from the HDRI data; and a tone mapper for performing tone mapping for displaying the HDRI data.

The image-based rendering unit further comprises an extended node processor for storing pixels of the HDRI data as floating points, and managing them, and when the HDRI data are used as texture, producing the floating point information into an extended node, and adding it to a scene graph.

In another aspect of the present invention, a virtual reality embodying method using a 2-dimensional image taken of a target object through a camera and HDRI data comprises: (a) comparing a coordinate of the 2D image with a real coordinate to calculate a transform matrix; (b) transforming a reference vector of the 2D image using the transform matrix to calculate a vanishing point of the reference vector; (c) using the vanishing point to control a principal point of the camera to be on a straight line, determining a principal point that satisfies predetermined conditions from among the principal points provided on the straight line to be a principal point of the camera, and determining a camera matrix using the principal point; (d) using the camera matrix and the transform matrix to calculate a rotation matrix and a translation vector of the camera; (e) using the rotation matrix and the translation vector of the camera to model the 2D image into a 3D virtual model; (f) separating the HDRI data for each element, and extracting 3D illumination information from the HDRI data; and (g) using the data produced in (f) to perform texture mapping for rendering the virtual model.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

In the following detailed description, only the preferred embodiment of the invention has been shown and described, simply by way of illustration of the best mode contemplated by the inventor(s) of carrying out the invention. As will be realized, the invention is capable of modification in various obvious respects, all without departing from the invention. Accordingly, the drawings and description are to be regarded as illustrative in nature, and not restrictive.

A virtual reality embodying system and method will be described with reference to drawings.

Figure 1:
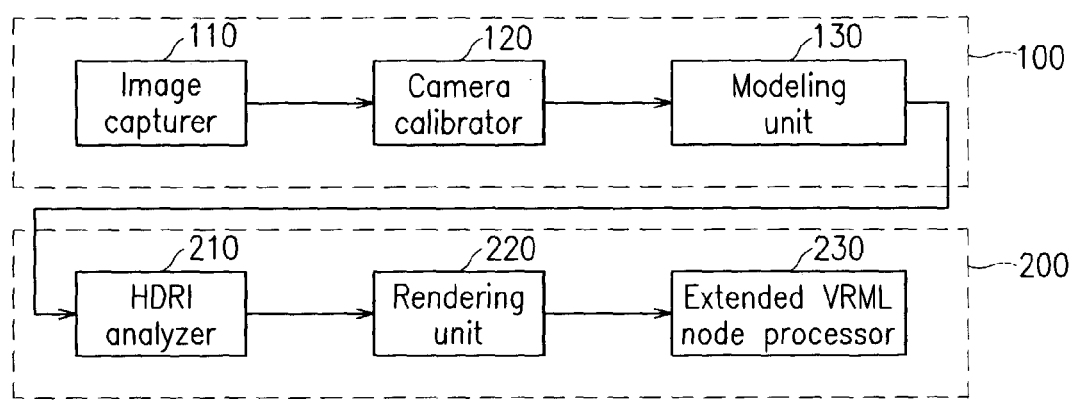
FIG. 1 shows a block diagram of a virtual reality embodying system according to a preferred embodiment of the present invention.

FIG. 1 shows a rough block diagram for a virtual reality embodying system according to a preferred embodiment of the present invention.

As shown, the virtual reality embodying system comprises an image-based modeling unit 100, and an image-based rendering unit 200. The image-based modeling unit 100 provides a method for modeling 3D virtual objects including color information by using a plurality of 2D images taken by a camera. The image-based modeling unit 100 comprises an image capturer 110, a camera calibrator 120, and a modeling unit 130. The image-based rendering unit 200 provides image-based rendering functions and model processing functions, and supports a user interface. The image-based rendering unit 200 comprises an HDRI (high dynamic range image) analyzer 210, a rendering unit 220, and an extended VRML node processor 230.

Referring to FIGS. 2 through 5, the image-based modeling unit and an image-based modeling method will be described.

Figure 2:
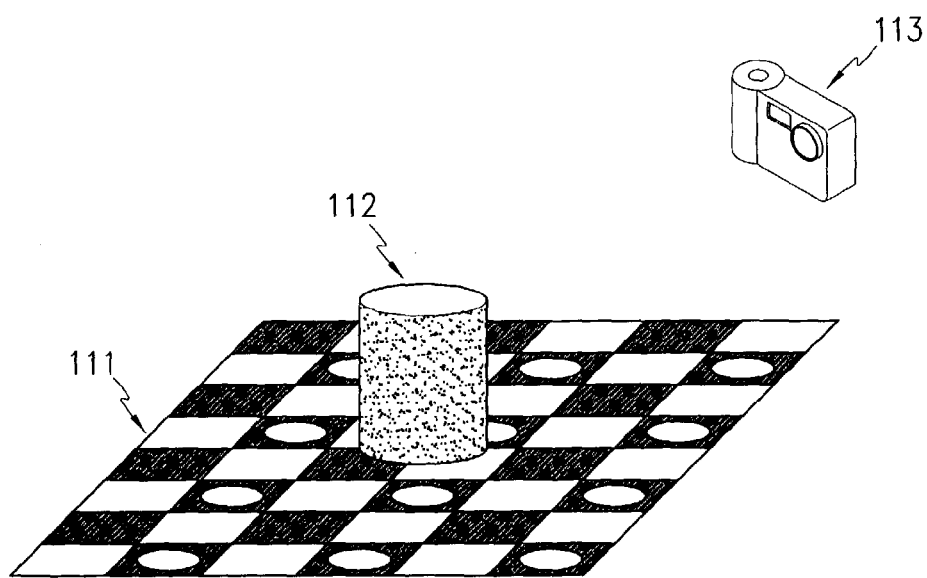
FIG. 2 shows a configuration diagram of an image capturer of an image-based modeling unit according to the preferred embodiment of the present invention.
Figure 3:
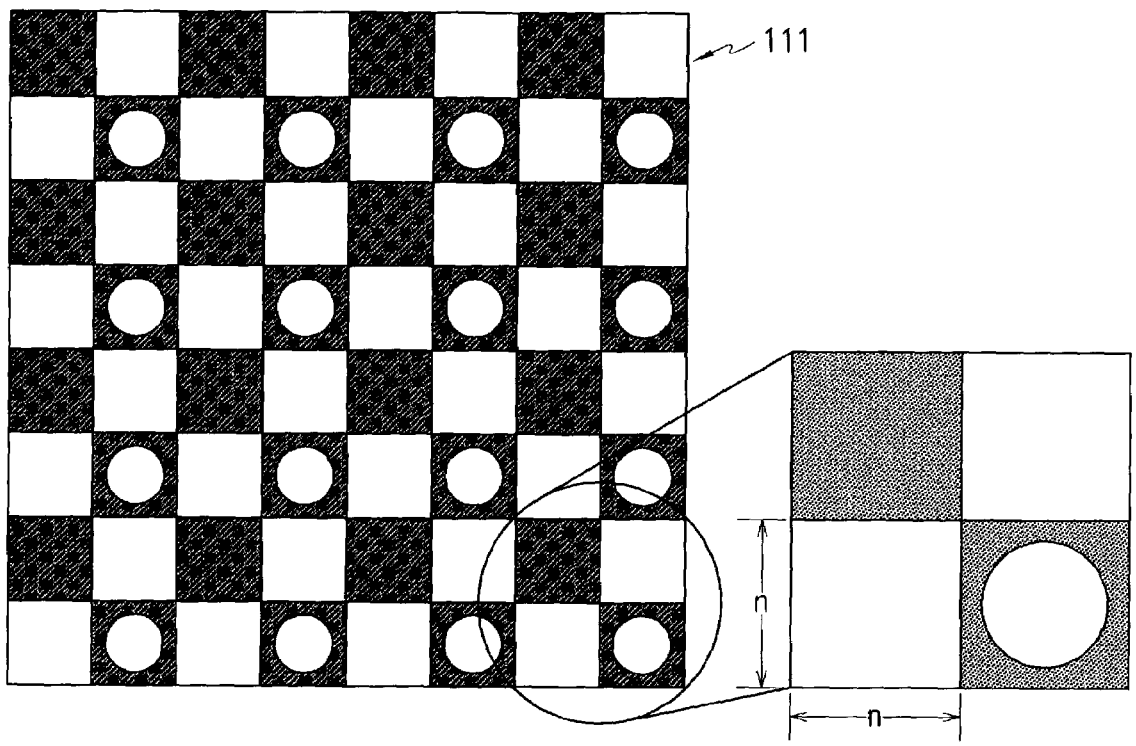
FIG. 3 shows a ground plan of a calibration board of the image capturer shown in FIG. 2.
Figure 4:
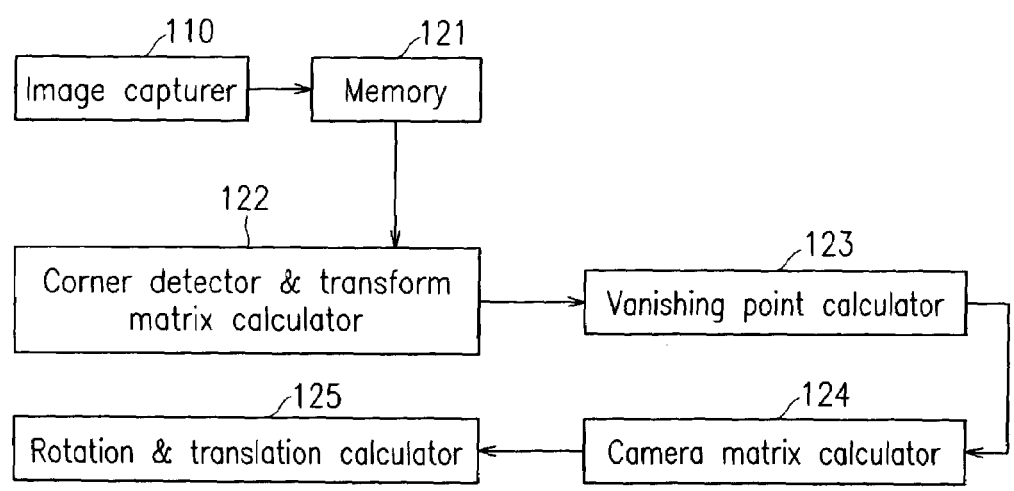
FIG. 4 shows a block diagram of a camera calibrator of the image-based modeling unit according to the preferred embodiment of the present invention.
Figure 5:
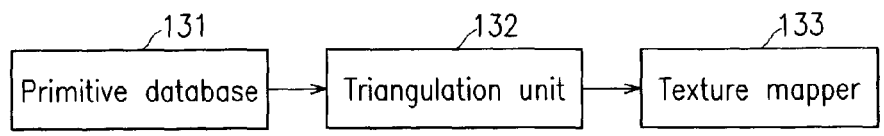
FIG. 5 shows a block diagram of a modeling unit of the image-based modeling unit according to the preferred embodiment of the present invention.

FIG. 2 shows a configuration diagram of an image capturer of an image-based modeling unit according to the preferred embodiment of the present invention, FIG. 3 shows a ground plan of a calibration board of the image capturer shown in FIG. 2, FIG. 4 shows a block diagram of a camera calibrator of the image-based modeling unit according to the preferred embodiment of the present invention, and FIG. 5 shows a block diagram of a modeling unit of the image-based modeling unit according to the preferred embodiment of the present invention.

Referring to FIGS. 2 and 3, the image capturer 110 captures an image of a target object 112 through a calibration board 111 and a digital camera 113. In FIG. 3, the calibration board 111 is a square board with black and white squares, each square being next to a square of a different color and having a predetermined constant ratio of length and breadth, and it is made of various materials including paper, acryl, or metal. A user puts a target object 112 on the calibration board 111 to photograph the same with the digital camera 113. Since the calibration board 111 has alternately-arranged black and white squares on it, basic information for estimating variations at the time of photographing the object 112 may be extracted from the image of the calibration board 111 taken together with the target object 112. Also, the checked pattern with different colors enables easy detection of corners between the lattices, and also provides a basic method for analyzing the captured image structure and extracting basic features by alternately arranging white circles. A plurality of 2D images on the target object is captured using the digital camera 113 of FIG. 2, and the 2D images are digitalized and stored in the memory 121.

The camera calibrator 120 for calculating the images captured by the image capturer 110 will now be described.

As shown in FIG. 4, the camera calibrator 120 comprises a memory 121, a corner detector and transform matrix calculator 122, a vanishing point calculator 123, a camera matrix calculator 124, and a rotation and translation calculator 125.

The memory 121 stores a plurality of 2D images captured by the image capturer 110. The corner detector and transform matrix calculator 122 extracts a corner point of the calibration board image from the 2D images stored in the memory 121 to compare a coordinate x' of the extracted corner point of the image with an actual measured value x of the calibration board 111, and uses Equation 1 to find a transform matrix H for representing a correlation between the extracted image coordinate x' and the actual coordinate x.

$$x'=Hx \qquad \text{Equation 1}$$

where x' represents a vector for indicating a corner point coordinate of the extracted image, x denotes a vector for showing a corner point coordinate of the calibration board, and H represents a transform matrix.

The vanishing point calculator 123 calculates a vanishing point ($v_x$, $v_y$) of two orthogonal sides [1,0,0] and [0,1,0] on the calibration board, and the vanishing point ($v_x$, $v_y$) is expressed in Equation 2:

$$v_x = H \times [1,0,0]^t$$

$$v_y = H \times [0,1,0]^t \qquad \text{Equation 2}$$

The camera matrix calculator 124 uses the vanishing point ($v_x$, $v_y$) calculated from Equation 2 to calculate a camera matrix K. The camera matrix K has factors including a focal length f, an aspect ratio α of a CCD pixel, and a location of a principal point (ox, oy), as expressed in Equation 3:

$$K = \begin{bmatrix} -f & 0 & ox \\ 0 & -\alpha f & oy \\ 0 & 0 & 1 \end{bmatrix} \qquad \text{Equation 3}$$

where f represents the focal length of the camera, α shows an aspect ratio, and ox and oy respectively indicate x and y coordinates of the principal point.

In general, a relation between the vanishing point ($vp_1$, $vp_2$) of two orthogonal directions and the camera matrix K satisfies Equation 4:

$$vp_1^t \times \omega \times vp_2 = 0 \qquad \text{Equation 4}$$

$$\omega = (KK^t)^{-1} = \begin{bmatrix} \left(\frac{1}{f}\right)^2 & 0 & -\frac{ox}{f^2} \\ 0 & \left(\frac{1}{\alpha f}\right)^2 & -\frac{oy}{(\alpha f)^2} \\ -\frac{ox}{f^2} & -\frac{oy}{(\alpha f)^2} & \left(\frac{ox}{f}\right)^2 + \left(\frac{oy}{\alpha f}\right)^2 + 1 \end{bmatrix}$$

When $$\left(\frac{1}{f}\right)^2 \text{ and } \left(\frac{1}{\alpha f}\right)^2$$

are defined to be new variables fx and fy, ω has four variables including fx, fy, ox, and oy. When the principal point (ox,oy) of the camera is given, the vanishing point ($vp_1$, $vp_2$) of the two orthogonal directions may be expressed as a linear equation with respect to fx and fy. When vectors in two directions on a rectangular plane are defined to be $v_1$, and $v_2$, and two orthogonal sides on the rectangular plane are set to be an x axis and a y axis of a reference coordinate system, the vectors $v_1$ and $v_2$ are expressed in Equation 5:

$$v_1 = p_1 \times [1,0,0]^t + q_1 \times [0,1,0]^t,$$

$$v_2 = p_2 \times [1,0,0]^t + q_2 \times [0,1,0]^t,$$

$$p_1 q_1 + p_2 q_2 = 0 \qquad \text{Equation 5}$$

where $p_1$, $p_2$, $q_1$, and $q_2$ are scalar.

The vanishing point in the $v_1$ and $v_2$ directions is given in Equation 6 from the transform matrix H:

$$vp_1 = H \times v_1 = p_1 \times v_x + q_1 v_y,$$

$$vp_2 = H \times v_2 = p_2 \times v_x + q_2 v_y, \qquad \text{Equation 6}$$

By applying Equation 6 to Equation 4, two linear equations are obtained as shown in Equation 7:

$$v_x^t \times \omega \times v_x - v_y^t \times \omega \times v_y = 0 \text{ when } p_1 q_1 \neq 0, p_2 q_2 \neq 0 \qquad (1)$$

$$v_x^t \times \omega \times v_y = 0 \text{ otherwise} (2) \qquad \text{Equation 7}$$

When the location of the principal point is assumed to be given, Equation 7 shows that the camera matrix K may be found from a single rectangular plane. Conventionally, the camera matrix is calculated assuming the location of the principal point as a center of the image. However, the aspect ratio is assumed to be 1 in the preferred embodiment of the present invention since the location of the principal point is sensitively varied depending on picture-taking conditions. According to Equation 7, the location of the principal point that satisfies the above-noted assumptions is restricted on a straight line.

In detail, fx and fy are expanded as an equation with respect to ox and oy from Equation 7. First, A and d that satisfy Equation 8 are induced from Equation 7.

$$Af = d \qquad \text{Equation 8}$$

where A shows a 2×2 matrix, the (i,j) element of A is indicated as A(i,j), and f is a vector satisfying $[fx, fy]^t$.

That is, Equation 9 may be induced from (2) of Equation 7, and Equation 10 from (1) of Equation 7.

$$A(1,1) = a_1 \times a_2 - a_2 \times c_1 \times ox - a_1 \times c_2 \times ox + c_1 \times c_2 \times ox^2,$$

$$A(1,2) = b_1 \times b_2 - b_2 \times c_1 \times oy - b_1 \times c_2 \times oy + c_1 \times c_2 \times oy^2,$$

$$b(1) = -c_1 \times c_2 \qquad \text{Equation 9}$$

$$A(2,1) = (a_1^2 - 2a_1 \times c_1 \times ox + c_1^2 \times ox^2) - (a_2^2 - 2a_2 \times c_2 \times ox + c_2^2 \times ox^2),$$

$$A(2,2) = (b_1^2 - 2b_1 \times c_1 \times oy + c_1^2 \times oy^2) - (b_2^2 - 2b_2 \times c_2 \times ox + c_2^2 \times oy^2),$$

$$b(2) = -c_1^2 + c_2^2 \qquad \text{Equation 10}$$

where $a_1 = v_x(1)$, $b_1 = v_x(2)$, $c_1 = v_x(3)$, $a_2 = v_y(1)$, $b_2 = v_y(2)$, and $c_2 = v_y(3)$, $v_x(i)$ represents the i-th element of the vector $v_x$, and $v_y(i)$ shows the i-th element of the vector $v_y$.

From Equations 8 through 10, fx and fy may be calculated as expressed in Equation 11.

$$f = A^{-1} b, \qquad \text{Equation 11}$$

$$fx = \frac{A(2,2) \times b(1) - A(1,2) \times b(2)}{A(1,1) \times A(2,2) - A(1,2) \times A(2,1)}$$

$$fy = \frac{A(1,1) \times b(2) - A(2,1) \times b(1)}{A(1,1) \times A(2,2) - A(1,2) \times A(2,1)}$$

As assumed above, since fx and fy are $$\left(\frac{1}{f}\right)^2 \text{ and } \left(\frac{1}{\alpha f}\right)^2$$

respectively, the aspect ratio α may be expressed in Equation 12 from Equation 11.

$$\alpha^2 = \frac{fx}{fy} = \frac{A(2,2) \times b(1) - A(1,2) \times b(2)}{A(1,1) \times b(2) - A(2,1) \times b(1)} \qquad \text{Equation 12}$$

As described above, solving of Equation 12 on the assumption that the aspect ratio α is 1 leads to Equation 13. That is, the camera matrix calculator 124 uses the vanishing point (vx,vy) of two orthogonal sides to restrict the x and y coordinates (ox,oy) of the principal point to be on the straight line.

$$l_1 \times ox + l_2 \times oy + l_3 = 0,$$

$$l_1 = -2 c_1 \times c_2 \times (a_2 \times c_2 - a_1 \times c_1) - (c_1^2 - c_2^2) \times (a_2 \times c_1 + a_1 \times c_2),$$

$$l_2 = -2 c_1 \times c_2 \times (b_2 \times c_2 - b_1 \times c_1) - (c_1^2 - c_2^2) \times (b_2 \times c_1 + b_1 \times c_2),$$

$$l_3 = c_1 \times c_2 \times \{(b_1^2 - b_2^2) + (a_1^2 - a_2^2)\} + (c_1^2 - c_2^2) \times (a_1 a_2 + b_1 \times b_2)$$

From among the points on the line provided by Equation 13, the point that minimizes E(ox,oy) of Equation 14 is selected as a camera principal point.

$$E(ox, oy) = \sum_{\forall i} (p_i - p'_i(ox, oy))^2, \qquad \text{Equation 14}$$

$$\text{where, } (ox - centerX)^2 + (oy - centerY)^2 \leq r^2$$

In Equation 14, $p_i$ represents the i-th measured image point, which is the image projection of i-th grid point of calibration board shown in FIG. 3, (centerX, centerY) indicates a coordinate of a center of an image, and $p'_i(ox,oy)$ denotes a point obtained by re-projecting the i-th grid point of the calibration board from the camera calibration result performed with respective candidates (ox,oy) for the principal point, where all the candidates exist on the line of Equation 13.

Note that as expressed in Equation 14, the points within a predetermined distance r from the center of the image are only considered in the process of minimizing the energy function E(ox,oy), which is based on the fact that the principal point of the camera is located near the center of the image.

A non-linear least square problem in connection with the minimization of the energy function may be solved by applying the Levenberg-Marquardt method. In minimizing the non-linear function (Equation 14), the initialization for the location of the principal point is set to be a point having a minimum distance to the center of the image among the points on the straight line of Equation 13.

As described, the camera matrix calculator 124 uses the principal point (ox,oy) determined from Equation 14 together with Equation 3 to calculate the camera matrix K.

Next, the rotation and translation calculator 250 uses a camera rotation matrix R and a camera translation vector t using Equation 15:

$$[r_1, r_2, t] = \frac{K^{-1}H}{\|K^{-1}H\|}, \qquad \text{Equation 15}$$

$$r_3 = r_1 \otimes r_2,$$

$$R = [r_1, r_2, r_3]$$

where $\|x\|$ represents a norm of x, indicates a cross product, $r_1$, $r_2$, and $r_3$ respectively show the first through third columns of the camera rotation matrix R, and t represents the camera translation vector. In this case, the camera rotation matrix R is a 3×3 matrix.

By using the camera rotation matrix R and the camera translation vector t, the modeling unit 130 models the captured image into a 3D image. As shown in FIG. 5, the modeling unit 130 comprises a primitive database 131, a triangulation unit 132, and a texture mapper 133.

The primitive database 131 stores geometric structures of 3D primitive objects including a circle, a cylinder, a sphere, and a triangular pyramid (which are basic models) as data files in the (X,Y,Z) coordinate format. The user may call a primitive object from the primitive database 131 and form a desired structure.

The triangulation unit 132 finds corresponding points from a plurality of 2D images taken with a 3D model measured so as to find random points that form a 3D model, and projects the corresponding points provided on each image back to the 3D space to calculate intersection points of the back projected lines. In this instance, the back projected line l is calculated as shown in Equation 16 by using the camera matrix K, the camera rotation matrix R, and the camera translation vector t obtained by the camera calibrator 120.

$$v=[X,Y,Z]^t,$$

$$v = s \times R^t \times K^{-1} \times p - R \times t \qquad \text{Equation 16}$$

where v is a point on the back projected line l, and p is a vector for showing the image coordinate [x,y] of the corresponding point as an arithmetic coordinate [x,y,1].

The texture mapper 133 extracts coordinate points of respective surfaces which form a geometric structure of a 3D model and corresponding color information from the 2D image captured by the image capturer 110 of FIG. 1 to obtain color images matched with the respective surfaces, and combines them with the geometric structure of a 3D model.

Accordingly, the 3D image model captured by the image-based modeling unit may be output as VRML data and used as a virtual model to be rendered by the image-based rendering unit 200. The image-based rendering unit 200 processes the virtual model using VRML nodes so as to display the virtual model to a screen, and uses HDRIs as input data. In this instance, the HDRIs may be produced by taking a plurality of photographs with different and various exposure degrees through an expensive HDRI-only camera or a general digital camera, and then using a program for assembling the photographs into HDRIs.

Figure 6:
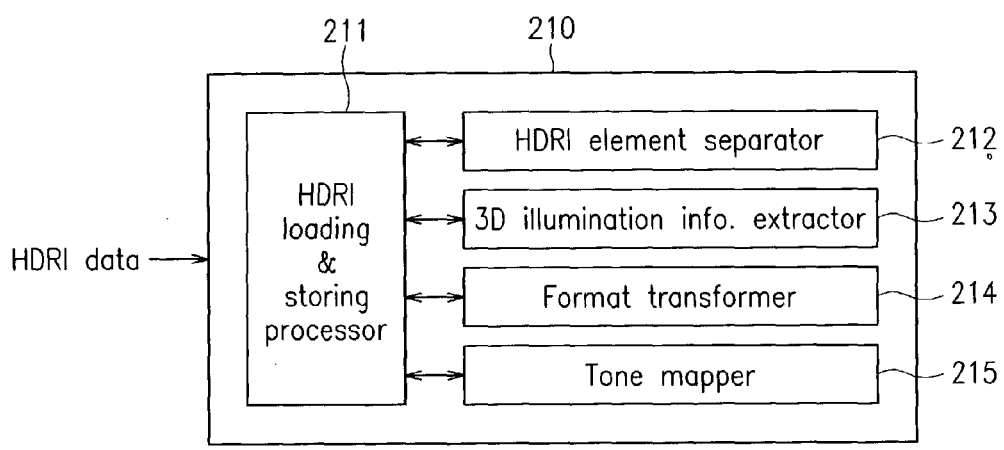
FIG. 6 shows a block diagram of an HDRI analyzer of the image-based rendering unit according to the preferred embodiment of the present invention.
Figure 7:
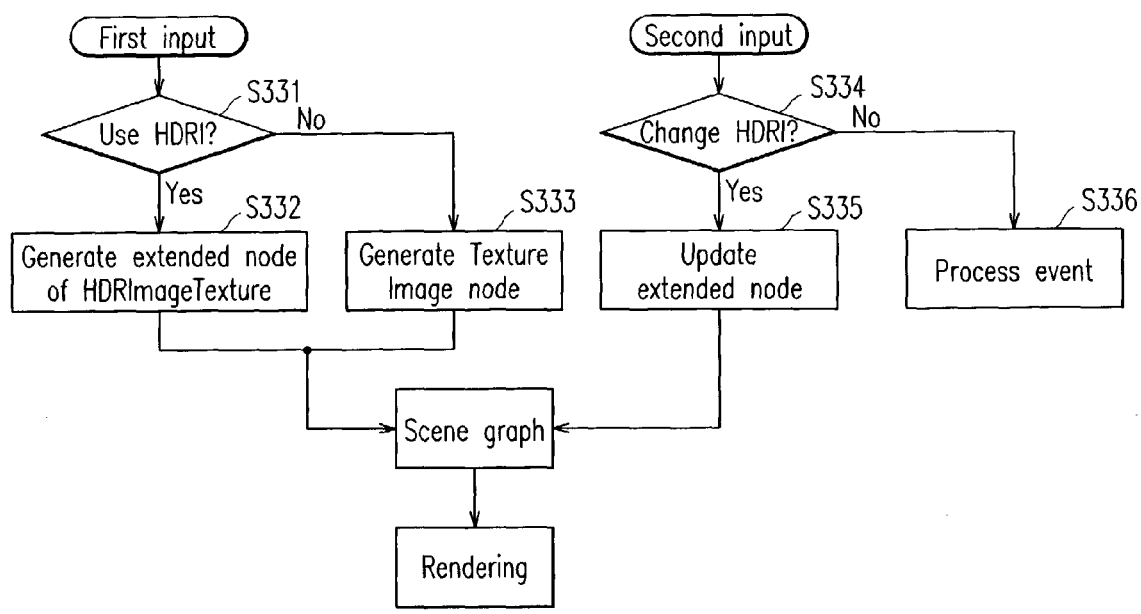
FIG. 7 shows a VRML node processing method by an extended VRML mode processor of the image-based rendering unit according to the preferred embodiment of the present invention.

Referring to FIGS. 6 and 7, the image-based rendering unit will be described.

FIG. 6 shows a rough block diagram of an HDRI analyzer of the image-based rendering unit according to the preferred embodiment of the present invention, and FIG. 7 shows a VRML node processing flowchart by an extended VRML mode processor of the image-based rendering unit according to the preferred embodiment of the present invention.

The HDRI analyzer 210 performs analysis and preprocess stages for using the HDRIs at the rendering unit 220. As shown in FIG. 6, the HDRI analyzer 210 comprises an HDRI loading and storing processor 211, an HDRI element separator 212, a 3D illumination information extractor 213, a format transformer 214, and a tone mapper 215.

The HDRI loading and storing processor 211 manages and stores the input HDRI. The HDRI element separator 212 diffuses the data stored in the HDRI loading and storing processor 211, and separates them according to specular elements. The 3D illumination information extractor 213 extracts 3D illumination information for producing shadows from the data stored in the HDRI loading and storing processor 211. The format transformer 214 converts the HDRI into a predetermined format so as to support various mapping patterns. The tone mapper 215 supports a tone mapping process for displaying the HDRIs. The HDRI element separator 212 and the format transformer 214 respectively store results as HDRI data again so as to be used for rendering texture maps. The 3D illumination information extractor 213 extracts 3D location information and color information on the illumination to store the same in a text format.

The rendering unit 220 not only provides basic functions for rendering virtual objects, but also uses information produced by the HDRI analyzer 210 to perform a texture mapping process for rendering VRML models.

The extended VRML node processor 230 is an extended node for storing pixels of the HDRI data in 32-bit floating points and managing the same, and when rendering scene graphs in the VRML environment, supporting the HDRIs. The extended VRML node processor 230 supports the HDRImageTexture node, and immediately applies an HDRI modification by the user to the VRML's scene graph, thereby enabling interactive rendering modifications.

Referring to FIG. 7, a method for processing VRML nodes at the extended VRML node processor 230 will be described in detail.

When generating a virtual space, the extended VRML node processor 230 receives a message of whether to use an HDRI from the user, and determines it in step S331. When using the HDRI as a texture, the extended VRML node processor 230 produces the previously stored floating point image information as an HDRImageTexture that is an extended VRML node, and adds the same to the scene graph in step S332. When not using the HDRI as a texture, the extended VRML node processor 230 uses the existing VRML node to produce a TextureImage node and add it to the scene graph in step S333. The scene graph is parsed by the rendering unit 220, and it is displayed to a screen. When receiving a message for applying the change of the HDRI texture from the user in step S334, the extended VRML node processor 230 updates the extended VRML node in the scene graph in step S335. When the message from the user does not represent the change of the HDRI, the message input by the user is processed as an event in step S336.

The image-based rendering unit may provide a user interface for managing the HDRI analyzer 210, the rendering unit 220, and the extended VRML node processor 330. The user interface provides an exposure control function, a format transform function, a viewing function, and an element-based HDRI data extraction function so as to process the HDRI data. Also, the user interface may provide a walk function, an examine function, a slide function, a point function, a straighten function, a rotation function, a translation function, and a scaling function in the 3D space so as to manipulate the virtual objects and the VRML data.

According to the present invention, the user may embody a virtual space by using 2D images and forming 3D virtual models including color. Further, the user may fully reflect the realistic effects of the real world when embodying a 3D virtual space, by providing a rendering function of the VRML data using the HDRI data.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A virtual reality embodying system for using a 2-dimensional (2D) image captured from a target object through a camera and HDRI (high dynamic range image) data to form a virtual space, comprising:
    an image-based modeling unit for comparing a coordinate of the 2D image with a measured coordinate to calculate a transform matrix, calculating a vanishing point of a reference vector from the transform matrix, using the vanishing point to calculate a camera matrix, and using the camera matrix and the transform matrix to model the 2D image into a virtual model; and
    an image-based rendering unit for using the HDRI data as a texture to render the virtual model.

2. The system of claim 1, wherein the image-based modeling unit comprises:
    a camera calibrator including a transform matrix calculator for calculating the transform matrix, a vanishing point calculator for transforming the reference vector into the transform matrix to calculate the vanishing point, a camera matrix calculator for using the vanishing point to determine a principal point of the camera and using the principal point to determine the camera matrix, and a rotation and translation calculator for calculating a camera rotation matrix and a camera translation vector through the camera matrix and the transform matrix; and
    a modeling unit for matching the 2D image with the virtual model and combining the virtual model with the texture by using the camera matrix and the translation vector.

3. The system of claim 2, wherein the vanishing point calculator uses two sides which are orthogonal on a predetermined plane to calculate the vanishing point using the reference vector.

4. The system of claim 2, wherein the camera matrix calculator controls the principal point of the camera to be on a straight line of $l_1 xox + l_2 xoy + l_3 = 0$ (where ox and oy respectively are an x coordinate and are an x coordinate and a y coordinate of the principal point, and $l_1, l_2$, and $l_3$ are variables determined by the vanishing point), and determines the point that minimizes $$\sum_{\forall i} (p_i - p'_i(ox, oy))^2$$

from among the principal points that satisfy the straight line to be the principal point of the camera (where $p_i$ is an i-th measured principal point, and $p_i'(ox,oy)$ represents calibration results performed with respect to the respective principal point locations (ox,oy)).

5. The system of claim 4, wherein the camera matrix is given as below:

$$\begin{bmatrix} -f & 0 & ox \\ 0 & -\alpha f & oy \\ 0 & 0 & 1 \end{bmatrix}$$

where f represents the focal length of the camera, and α shows an aspect ratio of the camera.

6. The system of claim 2, wherein the rotation and translation calculator determines the rotation matrix of the camera and the camera translation vector to be $[r_1, r_2, r_3]$ and t respectively (where $r_1, r_2, r_3$, and t satisfy $$[r_1, r_2, t] = \frac{K^{-1} H}{\|K^{-1} H\|}$$

and $r_3 = r_1 \hat{\times} r_2$, and K is the camera matrix, and H is the transform matrix).

7. The system of claim 1, wherein the 2D image is photographed when the target object is put on a calibration board on which squares of at least two colors are alternately and continuously arranged.

8. The system of claim 2, wherein the modeling unit comprises: a primitive database for storing data of basic 3D models in coordinate formats;

a triangulation unit for producing corresponding points of the 2D image obtained from the target object, using the camera rotation matrix and the camera translation matrix to back-project the corresponding points into a 3D space, and finding intersection points of lines back projected to the 3D space; and a texture mapper for extracting color information from the 2D image to map the same to the virtual model.

9. The system of claim 1, wherein the image-based rendering unit comprises:

an HDRI analyzer for analyzing the HDRI data, extracting 3D illumination data from the HDRI data to store them, and performing tone mapping for displaying the HDRI data; and a rendering unit for using the data generated by the HDRI analyzer to perform texture mapping for rendering the virtual model.

10. The system of claim 9, wherein the HDRI analyzer comprises: an HDRI element separator for diffusing the HDRI data and separating them for each specular element to store them as new HDRI data;

a 3D illumination information extractor for extracting 3D location information and color information on the illumination from the HDRI data; and a tone mapper for performing tone mapping for displaying the HDRI data.

11. The system of claim 10, wherein the HDRI analyzer further comprises a format transformer for transforming the format of the HDRI data.

12. The system of claim 9, wherein the image-based rendering unit further comprises an extended node processor for storing pixels of the HDRI data as floating points, and managing them, and when the HDRI data are used as texture, producing the floating point information into an extended node, and adding it to a scene graph.

13. An image-based modeling system for producing a 3-dimensional (3D) virtual model from a 2-dimensional (2D) image taken of a target object through a camera, comprising:

a camera calibrator including a transform matrix calculator for comparing a coordinate of the 2D image with a measured coordinate to calculate a transform matrix, a vanishing point calculator for transforming a reference vector of the 2D image using the transform matrix to calculate the vanishing point, a camera matrix calculator for using the vanishing point to control a principal point of the camera to be on a straight line, selecting a principal point that satisfies predetermined conditions from among the principal points provided on the straight line to be the principal point of the camera, and calculating a camera matrix, and a rotation and translation calculator for using the camera matrix and the transform matrix to calculate a rotation matrix and a translation matrix of the camera; and a modeling unit for using the rotation matrix and the translation matrix of the camera to model the 2D image into a virtual model.

14. The system of claim 13, wherein the modeling unit comprises:

a primitive database for storing data of basic 3D models in coordinate formats;

a triangulation unit for producing corresponding points of the 2D image obtained from the target object, using the camera rotation matrix and the camera translation matrix to back-project the corresponding points into a 3D space, and finding intersection points of lines back-projected to the 3D space; and a texture mapper for extracting color information from the 2D image to map the same to the virtual model.

15. An image-based rendering system for using an HDRI (high dynamic range image) to render a 3-dimensional (3D) virtual model, comprising:

an HDRI analyzer for separating the HDRI data for each element, extracting 3D illumination data from the HDRI data, and performing tone mapping for displaying the HDRI data;

a rendering unit for using the data generated by the HDRI analyzer to perform texture mapping for rendering the virtual model; and an extended node processor for storing pixels of the HDRI data as floating points, and managing them, and when the HDRI data are used as texture, producing the floating point information into an extended node, and adding it to a scene graph.

16. The system of claim 15, wherein the HDRI analyzer comprises:

an HDRI element separator for diffusing the HDRI data and separating them for each specular element to store them as new HDRI data;

a 3D illumination information extractor for extracting 3D location information and color information on the illumination from the HDRI data, and storing them in the texture format; and a tone mapper for performing the tone mapping.

17. A virtual reality embodying method using a 2-dimensional (2D) image taken of a target object through a camera and HDRI (high dynamic range image) data, comprising:

comparing a coordinate of the 2D image with a measured coordinate to calculate a transform matrix;

transforming a reference vector of the 2D image using the transform matrix to calculate a vanishing point of the reference vector;

using the vanishing point to control a principal point of the camera to be on a straight line, determining a principal point that satisfies predetermined conditions from among the principal points provided on the straight line to be a principal point of the camera, and determining a camera matrix using the principal point;

using the camera matrix and the transform matrix to calculate a rotation matrix and a translation vector of the camera; and using the rotation matrix and the translation vector of the camera to model the 2D image into a 3D virtual model.

18. The method of claim 17, wherein (e) further comprises extracting color information from the 2D image to map the color information to the virtual model.

19. The method of claim 17, further comprising:

separating the HDRI data for each element, and extracting 3D illumination information from the HDRI data; and using the data produced in (f) to perform texture mapping for rendering the virtual model.

20. The method of claim 19, wherein (f) further comprises performing tone mapping for displaying the HDRI data.

21. The method of claim 19, further comprising (h) producing the HDRI data into an extended node and adding it to a scene graph when the HDRI data are used as texture.

* * * * *